United States Patent
Eun et al.

(10) Patent No.: US 8,917,331 B2
(45) Date of Patent: Dec. 23, 2014

(54) DIGITAL PHOTOGRAPHING APPARATUS AND METHOD OF CONTROLLING THE SAME

(75) Inventors: Sung-ho Eun, Seoul (KR); Jeoung-gon Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 962 days.

(21) Appl. No.: 12/949,880

(22) Filed: Nov. 19, 2010

(65) Prior Publication Data

US 2011/0122290 A1 May 26, 2011

(30) Foreign Application Priority Data

Nov. 20, 2009 (KR) .................. 10-2009-0112777

(51) Int. Cl.
| | |
|---|---|
| *H04N 5/235* | (2006.01) |
| *H04N 5/225* | (2006.01) |
| *H04N 1/21* | (2006.01) |
| *H04N 5/232* | (2006.01) |
| *H04N 1/00* | (2006.01) |
| *H04N 101/00* | (2006.01) |

(52) U.S. Cl.
CPC ............. *H04N 5/232* (2013.01); *H04N 1/2166* (2013.01); *H04N 2201/3278* (2013.01); *H04N 2101/00* (2013.01); *H04N 1/00477* (2013.01); *H04N 2201/214* (2013.01); *H04N 1/00384* (2013.01); *H04N 2201/3242* (2013.01); *H04N 5/23216* (2013.01); *H04N 2201/3274* (2013.01); *H04N 1/00347* (2013.01); *H04N 1/0044* (2013.01); *H04N 2201/3254* (2013.01)
USPC ..................................... 348/231.1; 348/207.1

(58) Field of Classification Search
USPC ................................ 348/207.1, 231.1, 231.2
See application file for complete search history.

(56) References Cited

U.S. PATENT DOCUMENTS

| | | | | |
|---|---|---|---|---|
| 6,160,964 | A * | 12/2000 | Imoto | ............................ 396/300 |
| 6,864,918 | B2 * | 3/2005 | Koide | ......................... 348/231.1 |
| 8,363,121 | B2 | 1/2013 | Maeng | |
| 2006/0152582 | A1 * | 7/2006 | Uchida | ............................ 348/79 |
| 2009/0005071 | A1 * | 1/2009 | Forstall et al. | ............. 455/456.1 |
| 2009/0009609 | A1 * | 1/2009 | Maeda | ........................ 348/207.1 |

FOREIGN PATENT DOCUMENTS

| | | |
|---|---|---|
| CN | 1984254 A | 6/2007 |
| CN | 101472068 A | 7/2009 |
| CN | 101790046 A | 7/2010 |

OTHER PUBLICATIONS

Office Action issued for CN 201010566751.1 (Feb. 25, 2014).
Office Action issued for CN 201010566751.1 (Sep. 28, 2014).

* cited by examiner

*Primary Examiner* — Joel Fosselman
(74) *Attorney, Agent, or Firm* — Drinker Biddle & Reath LLP

(57) ABSTRACT

A digital photographing apparatus and a method of controlling the same. A method of controlling a digital photographing apparatus, the method including determining whether a condition for changing an environment setup of the digital photographing apparatus is satisfied; if the condition is satisfied, searching for an environment setup to be changed according to the condition; and changing the environment setup according to the condition.

10 Claims, 8 Drawing Sheets

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2009-0112777, filed on Nov. 20, 2009, in the Korean Intellectual Property Office, the entire disclosure of which is incorporated herein by reference.

BACKGROUND

1. Field of the Invention

Embodiments of the invention relate to a digital photographing apparatus and a method of controlling the same, and more particularly, to a user-customizable digital photographing apparatus and a method of controlling the same.

2. Description of the Related Art

Digital photographing apparatuses often allow a user to change an environment setup by using a manipulation unit. Examples of a digital photographing apparatus include a digital still camera (DSC), a digital single-lens reflex camera (DSLR), and a digital video camera.

The environment setup may be changed according to a user's needs by, for example, using a setup menu. Examples of environment setups include a photographing state display setup, an image delete or move setup, a video mode, a language mode, and a time mode.

However, unless a setup menu is reset or a user manually changes a setting of an environment setup, the environment setup maintains its setting regardless of state changes of the digital photographing apparatus such as the digital photographing apparatus being turned on or off, or the digital photographing apparatus performing photography. The static nature of the environment setups may make it difficult for the user to have desired settings for the environment setups.

SUMMARY

Therefore there is a need in the art for embodiments of the invention which provide a digital photographing apparatus that is user-customizable by automatically changing an environment setup, and a method of controlling the same.

According to an embodiment of the invention, there is provided a method of controlling a digital photographing apparatus, the method including determining whether a condition for changing an environment setup of the digital photographing apparatus is satisfied; searching for an environment setup to be changed according to the condition if the condition is satisfied; and changing the environment setup according to the condition.

The environment setup may include a command signal for indicating whether to insert additional information into an image file to be stored or output, the condition may represent whether photographing state information is displayed on a display unit in a reproduction mode or a preview mode, a command signal for indicating to insert the additional information may be set as the environment setup if the photographing state information is displayed, and a command signal for indicating not to insert the additional information may be set as the environment setup if the photographing state information is not displayed.

The environment setup may include an image delete function, the condition may represent whether a storage has a remaining capacity, the image delete function may be activated as the environment setup if the storage does not have a remaining capacity, and the image delete function may be inactivated as the environment setup if the storage has a remaining capacity.

The environment setup may include an image file moving function for moving image files to external memory, the condition may represent whether a storage has a remaining capacity, the image file moving function may be activated as the environment setup if the storage does not have a remaining capacity, and the image file moving function may be inactivated as the environment setup if the storage has a remaining capacity.

The environment setup may include a video mode, a language mode or a time mode, the condition may represent location information obtained by a global positioning system (GPS), the video mode may be changed into a phase alternating line (PAL) mode as the environment setup if the location information indicates Europe, the language mode may be changed into a language of a country indicated by the location information, as the environment setup, and the time mode may be changed into a date or time of a place indicated by the location information, as the environment setup.

The environment setup to be changed according to the condition may be designated by a user.

According to another embodiment of the invention, there is provided a digital photographing apparatus including a condition determination unit for determining whether a condition for changing an environment setup of the digital photographing apparatus is satisfied; a storage for storing environment setups to be changed according to conditions; a storage search unit for searching the storage for an environment setup to be changed according to the condition if the condition is satisfied; and an environment setup change unit for changing the environment setup according to the condition.

The environment setup may include a command signal for indicating whether to insert additional information into an image file to be stored or output, the condition may represent whether photographing state information is displayed on a display unit in a reproduction mode or a preview mode, the condition determination unit may include a photographing state information display determination unit for determining whether the photographing state information is displayed on the display unit in the reproduction mode or the preview mode, and the environment setup change unit may include an additional information insertion setup change unit for setting a command signal for indicating to insert the additional information as the environment setup if the photographing state information is displayed, and for setting a command signal for indicating not to insert the additional information as the environment setup if the photographing state information is not displayed.

The environment setup may include an image delete function, the condition may represent whether the storage has a remaining capacity, the condition determination unit may include a storage remaining capacity determination unit for determining whether the storage has a remaining capacity, and the environment setup change unit may include an image delete function setup change unit for activating the image delete function as the environment setup if the storage does not have a remaining capacity, and inactivating the image delete function as the environment setup if the storage has a remaining capacity.

The environment setup may include an image file moving function for moving image files to external memory, the condition may represent whether a storage has a remaining capacity, the condition determination unit may include a storage remaining capacity determination unit for determining whether the storage has a remaining capacity, and the environment setup change unit may include an image file moving setup change unit for activating the image file moving function as the environment setup if the storage does not have a remaining capacity, and the image file moving function is inactivated as the environment setup if the storage has a remaining capacity.

The environment setup may include a video mode, the condition may represent location information obtained by a global positioning system (GPS), the condition determination unit may include a location determination unit for determining whether the location information indicates Europe, and the environment setup change unit may include a video mode setup change unit for changing the video mode into a phase alternating line (PAL) mode as the environment setup if the location information indicates Europe.

The environment setup may include a language mode, the condition may represent location information obtained by a GPS, the condition determination unit may include a location determination unit for receiving the location information, and the environment setup change unit may include a language mode setup change unit for changing the language mode into a language of a country indicated by the location information, as the environment setup.

The environment setup may include a time mode, the condition may represent location information obtained by a GPS, the condition determination unit may include a location determination unit for receiving the location information, and the environment setup change unit may include a time mode setup change unit for changing the time mode into a date or time of a place indicated by the location information, as the environment setup.

The environment setup to be changed according to the condition may be designated by a user.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
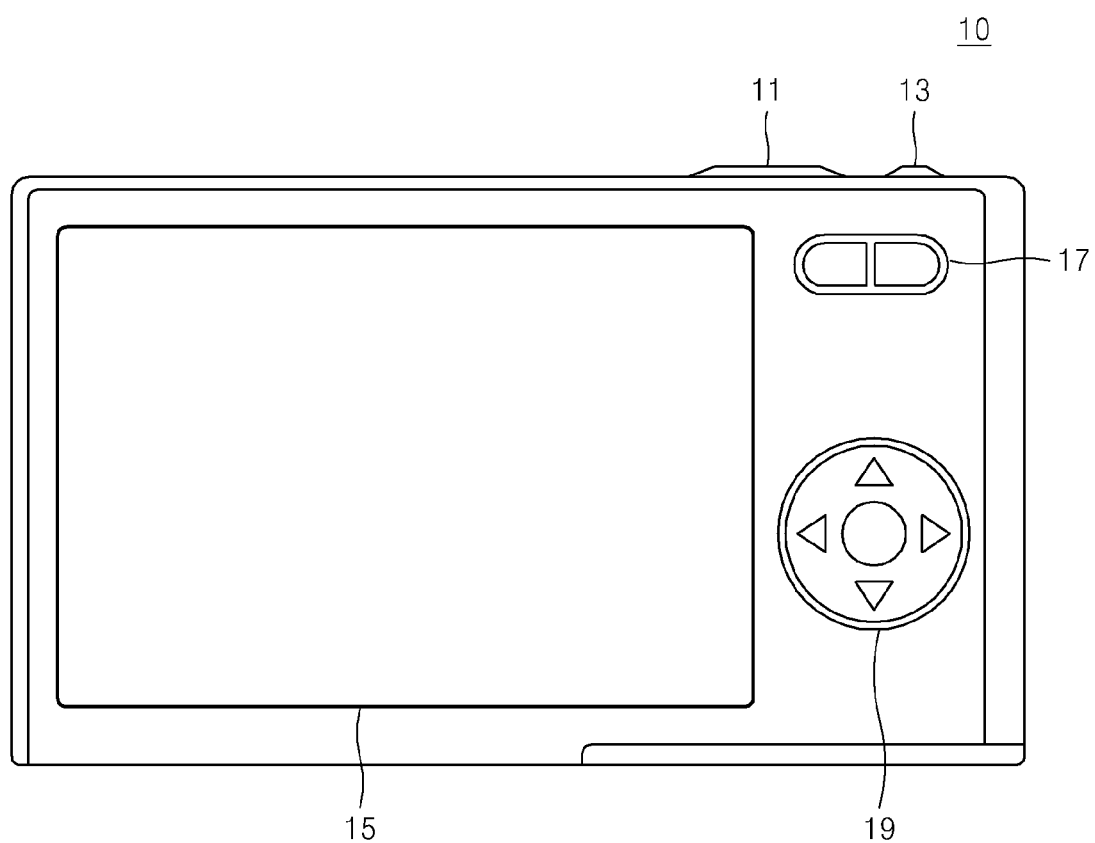
FIG. 1 is a rear view of a digital photographing apparatus, according to an embodiment of the invention.

Hereinafter, embodiments of the invention will be described in detail by explaining embodiments of the invention with reference to the attached drawings. Like reference numerals in the drawings denote like elements and thus repeated descriptions will be omitted.

FIG. 1 is a rear view of a digital photographing apparatus 10, according to an embodiment of the invention.

Referring to FIG. 1, a power button 11 is input so as to provide power to the digital photographing apparatus 10.

A shutter release button 13 opens or closes an iris (not shown) so as to expose an image sensor such as a charge coupled device (CCD) to light for a determined time in a still image or video photographing mode, and records an image of a subject on the CCD in association with the iris.

A wide-zoom/tele-zoom button 17 increases or decreases a viewing angle and, in particular, is input so as to change the size of a selected exposure area. When a wide-zoom button is input, zoom out is performed and thus it looks as if the subject is far away. That is, as the viewing angle is increased, a wide-angle image may be captured and the size of the selected exposure area is decreased. When a tele-zoom button is input, zoom in is performed and thus it looks as if the subject is close. That is, as the viewing angle is decreased, a narrow-angle image may be captured and the size of the selected exposure area is increased.

A direction/menu selection button 19 is used to activate a menu or to move a cursor. A direction button may move upward/downward/leftward/rightward so as to select an arbitrary value of a main menu item such as color or brightness, or may activate a sub-menu icon included in a main menu icon. A menu selection button may directly select a main menu icon or a sub-menu icon so as to execute a function corresponding to the selected menu icon.

Figure 2:
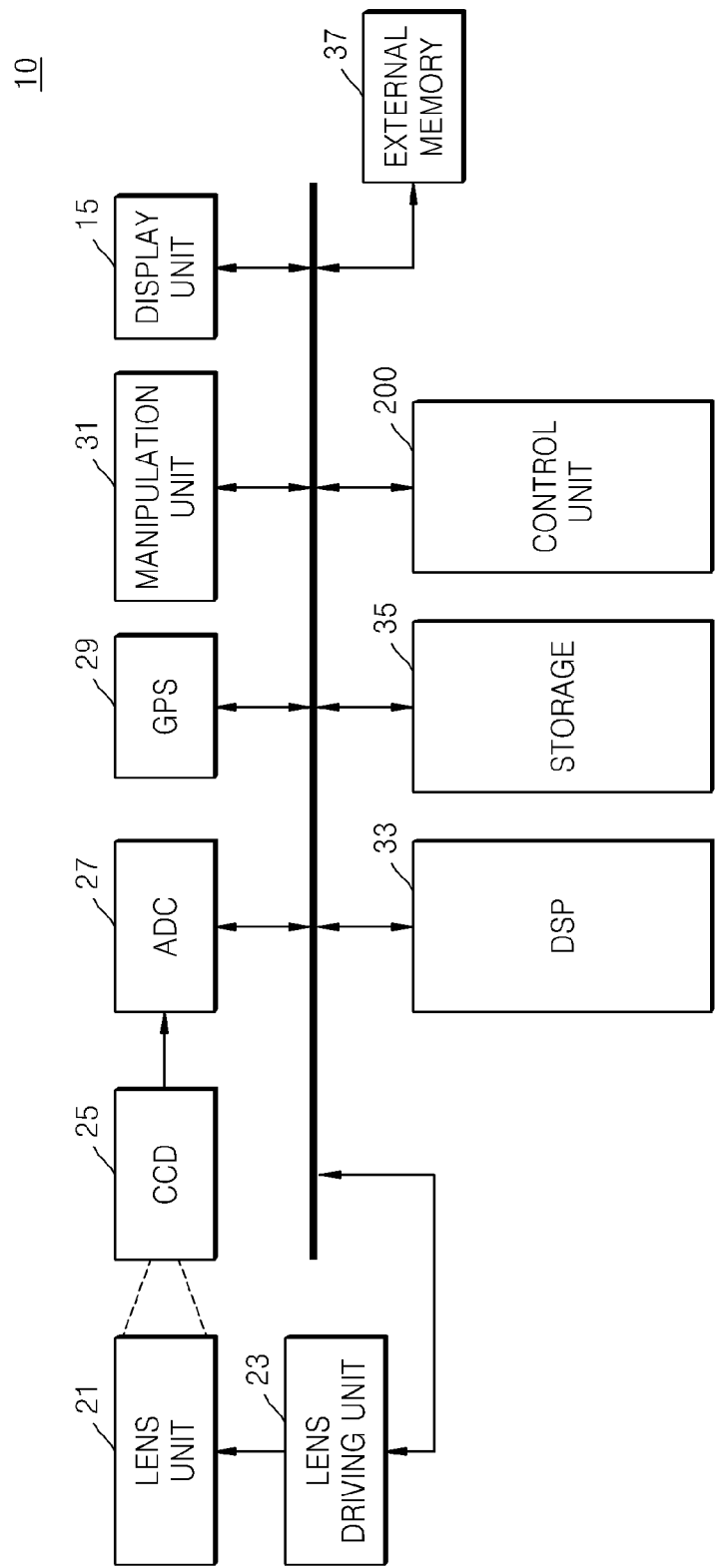
FIG. 2 is a block diagram of the digital photographing apparatus illustrated in FIG. 1, according to an embodiment of the invention.

FIG. 2 is a block diagram of the digital photographing apparatus 10 illustrated in FIG. 1, according to an embodiment of the invention.

Referring to FIG. 2, the digital photographing apparatus 10 includes a display unit 15, a lens unit 21, a lens driving unit 23, an image sensor such as a CCD 25, an analog-to-digital converter (ADC) 27, a global positioning system (GPS) 29, a manipulation unit 31, a digital signal processor (DSP) 33, a storage 35 and a control unit 200.

The lens unit 21 may include a lens for obtaining an optical signal, an iris for adjusting the intensity of the optical signal (light intensity), and a shutter for controlling the optical signal to be input. The lens unit 21 includes a zoom lens for controlling a viewing angle to be increased or decreased according to a focal length, and a focus lens for focusing on a subject. Each of the zoom and focus lenses may be formed as a single lens or a group of a plurality of lenses. The shutter may be a mechanical shutter for moving a lens shade up and down. In this case, instead of including an additional shutter device, providing of an electrical signal to the CCD 25 may be controlled so as to function as the shutter.

The lens driving unit 23 includes a motor for driving the lens unit 21 and the motor may receive a control signal from the DSP 33 so as to drive the lens unit 21. In addition, the lens driving unit 23 may control the position of the lens, opening or closing of the iris, operation of the shutter and the like so as to perform auto focusing, automatic exposure adjustment, aperture adjustment, zooming, focus changing and the like.

The CCD 25 receives an optical signal input from the lens unit 21 so as to form an image of a subject. Although the CCD 25 is used as an image sensor in FIG. 2, a complementary metal oxide semiconductor (CMOS) sensor array may also be used as the image sensor.

The ADC 27 converts an electrical signal provided by the CCD 25 from an analog signal into a digital signal.

A GPS satellite (not shown) includes four accurate clocks having an error of only about 1 sec. during approximately 160,000 years. Based on the four accurate clocks, the GPS satellite provides time information having an error of about $10^{-9}$ sec. or less and three-dimensional location information including latitude, longitude and altitude information.

The GPS 29 receives its GPS information, i.e., the time, latitude, longitude and altitude information from the GPS satellite at a predetermined time interval, e.g., at a 10 sec. interval.

In a GPS system including the GPS satellite and the GPS 29 of the digital photographing apparatus 10, the GPS 29 receives location detection waves simultaneously transmitted in every second to the surface of the earth from twenty four GPS satellites (not shown) located at an altitude of about 20,000 km around the Earth, and displays on a digital map its time information and location information three-dimensionally representing a current location (a latitude, a longitude and an altitude).

The manipulation unit 31 may include elements required when a user manipulates the digital photographing apparatus 10 or manages various photographing setups. For example, the manipulation unit 31 may include buttons, keys, a touch panel, a touch screen, a dial or the like and may input user control signals such as power on/off, photographing start/stop, reproduction start/stop/search, optical system driving, mode change, menu manipulation and selection manipulation signals. The power button 11, the shutter release button 13, the wide-zoom/tele-zoom button 17 and the direction/menu selection button 19 illustrated in FIG. 1 are included in the manipulation unit 31.

The DSP 33 may reduce noise from input image data and may perform image signal processing such as gamma correction, color filter array interpolation, color matrix, color correction or color enhancement so as to improve image quality. Also, the DSP 33 may generate an image file by compressing the image data on which image signal processing is performed, or may restore the image data from the image file. A compression format of the image file may be a reversible format or an irreversible format. Examples of the compression format may be a Joint Photographic Experts Group (JPEG) format and a JPEG 2000 format. Also, the DSP 33 may also functionally perform coloring, blurring, edge enhancement, image analysis, image recognition, image effect processing and the like. Image recognition may include face recognition, scene recognition and the like. Furthermore, the DSP 33 may perform image signal processing required to display an image on the display unit 15. For example, the DSP 33 may perform luminance level adjustment, color correction, contrast adjustment, edge enhancement, screen division, generation and composition of additional information with an image and the like. The DSP 33 may be connected to an external monitor, may perform predetermined image signal processing on image data, and may control an image to be displayed on the external monitor by transmitting the image data.

The display unit 15 may display an image corresponding to the image data provided by the DSP 33. The display unit 15 may be a liquid crystal display (LCD). However, the display unit 15 is not limited thereto and may also be an organic electroluminesence display device, an electrophoretic display device or the like.

The storage 35 may function as a recording device for temporally storing input image data, calculation data, processing results and the like and for storing image files. Also, the storage 35 may store a method required to operate the digital photographing apparatus 10, setup data that is environment setup information corresponding to conditions for changing environment setups, and the like.

An external memory 37 records captured images. The external memory 37 may be detachable from the digital photographing apparatus 10 and may be a memory card that is a card-type memory device for recording data on flash memory.

Hereinabove, the configuration of the digital photographing apparatus 10 is described. Examples of the control unit 200 of the digital photographing apparatus 10 will now be described with reference to FIGS. 3 through 6.

Figure 3:
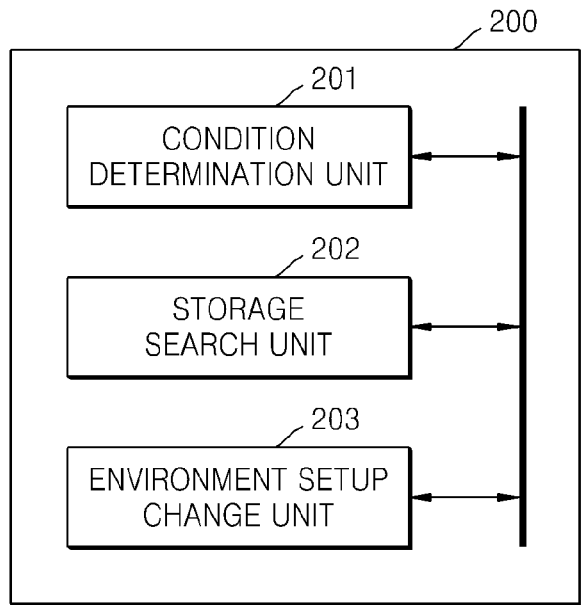
FIGS. 3 through 6 are block diagrams of examples of a control unit of the digital photographing apparatus illustrated in FIG. 2, according to embodiments of the invention.

FIG. 3 is a block diagram of the control unit 200 of the digital photographing apparatus 10 illustrated in FIG. 2, according to an embodiment of the invention.

Referring to FIGS. 2 and 3, the control unit 200 may include a condition determination unit 201, a storage search unit 202 and an environment setup change unit 203.

The condition determination unit 201 determines whether a condition for changing an environment setup of the digital photographing apparatus 10 is satisfied. Examples of conditions are whether photographing state information is displayed on the display unit 15, whether the storage 35 has a remaining capacity, location information obtained by the GPS 29 and the like. Also, environment setups correspond to various values for setting a driving environment of the digital photographing apparatus 10. For example, whether additional information is inserted into an image file, whether an image delete function is activated, whether a current environment is appropriate to move image files to the external memory 37, a video mode, a language mode, a time mode and the like may be environment setup values.

If the condition determination unit 201 determines that a condition for changing an environment setup of the digital photographing apparatus 10 is satisfied, the storage search unit 202 searches the storage 35 for an environment setup value to be changed according to the condition.

The environment setup change unit 203 changes the environment setup according to the search result of the storage search unit 202. The environment setup change unit 203 may control elements of the digital photographing apparatus 10, e.g., the display unit 15 and the external memory 37, so as to display or apply the changed environment setup.

As such, an environment setup of the digital photographing apparatus 10 may be automatically changed when a condition for changing the environment setup is satisfied, and thus functions of the digital photographing apparatus 10 may be used more conveniently. Also, the environment setup to be changed according to the condition may be designated by a user and thus the digital photographing apparatus 10 may be user-customized.

Figure 4:
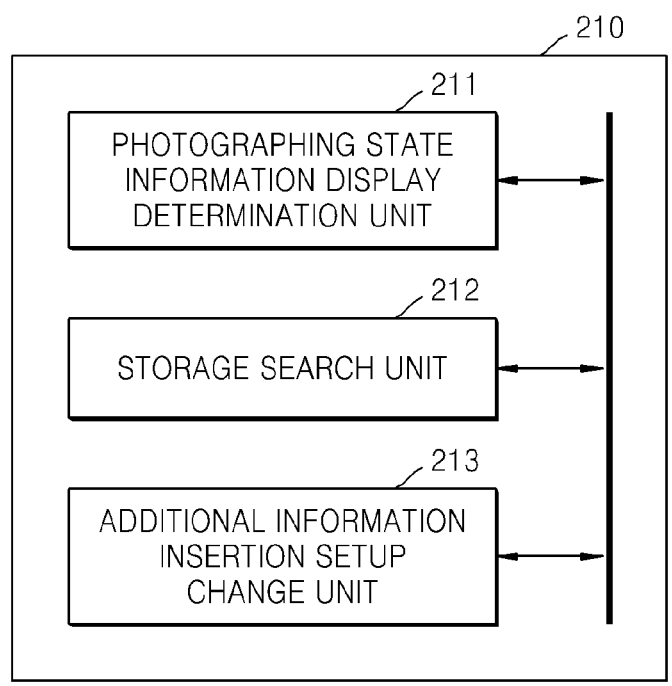

FIG. 4 is a block diagram of a control unit 201 of the digital photographing apparatus 10 illustrated in FIG. 2, according to another embodiment of the invention. The control unit 210 illustrated in FIG. 4 is similar to the control unit 200 illustrated in FIG. 3 in that an environment setup is automatically changed according to a condition, and is different from the control unit 200 in a condition for changing an environment setup and the type of the environment setup to be changed. Thus, FIG. 4 will be described mainly with respect to the difference from FIG. 3.

Referring to FIGS. 2 and 4, the control unit 210 may include a photographing state information display determination unit 211, a storage search unit 212 and an additional information insertion setup change unit 213.

The photographing state information display determination unit 211 determines whether photographing state information is displayed on the display unit 15 in a reproduction mode or a preview mode. For example, the photographing state information display determination unit 211 determines whether an icon representing a reproduction mode, an icon representing a photographing date, an icon representing resolution, an icon representing flash on/off, an icon representing shutter speed, an icon representing an aperture value, an icon representing whether an audio memo exists, or an icon representing whether an image is protected is displayed on the display unit 15 in a reproduction mode. Also, for example, the photographing state information display determination unit 211 determines whether an icon representing a photographing mode such as an automatic, program or automatic speech recognition (ASR) mode, an icon representing a scene mode such as a landscape, close-up, text, sunset, backlight or portrait mode, or an icon representing an aperture value (e.g., F 2.8), shutter speed (e.g., ⅓₀), flash on/off, audio recording prohibition, an exposure correction mark, photometry, image quality or resolution is displayed on the display unit 15 in a preview mode. As the photographing state information, the above-mentioned icons correspond to environment setup values that may be controlled not to be displayed on the display unit 15 if a user does not want.

The storage search unit 212 searches for an environment setup value to be changed according to whether the photographing state information is displayed on the display unit 15. For example, an environment setup value representing whether to insert additional information into an image file is stored according to whether the photographing state information is displayed, and the storage search unit 212 searches for the environment setup value.

The additional information insertion setup change unit 213 changes an additional information insertion setup that is an environment setup value, according to the search result. For example, if the photographing state information is displayed on the display unit 15 in a reproduction mode or a preview mode, the user wants to display additional information of an image file on an image. In this case, the additional information insertion setup change unit 213 sets to insert additional information such as a date, time and a memo into an image file to be stored or output. In more detail, a compressed image file consists of image data and additional information data including the additional information. The additional information insertion setup change unit 213 adds a command signal for indicating whether to compose the additional information data with the image data, into the image file, and compresses and stores the image file. For example, if the photographing state information is displayed on the display unit 15, the additional information insertion setup change unit 213 marks '1' on one segment of an exchangeable image file (Exif) header of the image file as a command signal for indicating to compose the additional information data with the image data, and stores the image file. In this case, the digital photographing apparatus 10 that reads and displays the image file or a printer that reads and outputs the image file decodes the command signal of the Exif header, which is added by the additional information insertion setup change unit 213. As a result, when the image file is displayed or output, related additional information composed with an image is represented.

Also, if the photographing state information is not displayed on the display unit 15, the user does not want to display additional information of an image file on an image and wants an image into which the additional information is not inserted. In this case, the additional information insertion setup change unit 213 sets not to insert additional information such as a date, time or a memo into an image file to be stored or output. For example, if the user sets not to display the photographing state information on the display unit 15, the additional information insertion setup change unit 213 marks '0' on one segment of an Exif header of the image file as a command signal for indicating not to compose additional information data with image data, and stores the image file. In this case, the digital photographing apparatus 10 reads and displays the image file or a printer reads and outputs the image file decodes the command signal of the Exif header, which is added by the additional information insertion setup change unit 213. As a result, when the image file is displayed or output, related additional information is not composed with an image.

As such, whether to insert additional information into an image file to be stored or output may be automatically determined according to a condition set by a user in a reproduction mode or a preview mode and thus the digital photographing apparatus 10 may be user-customized.

Figure 5:
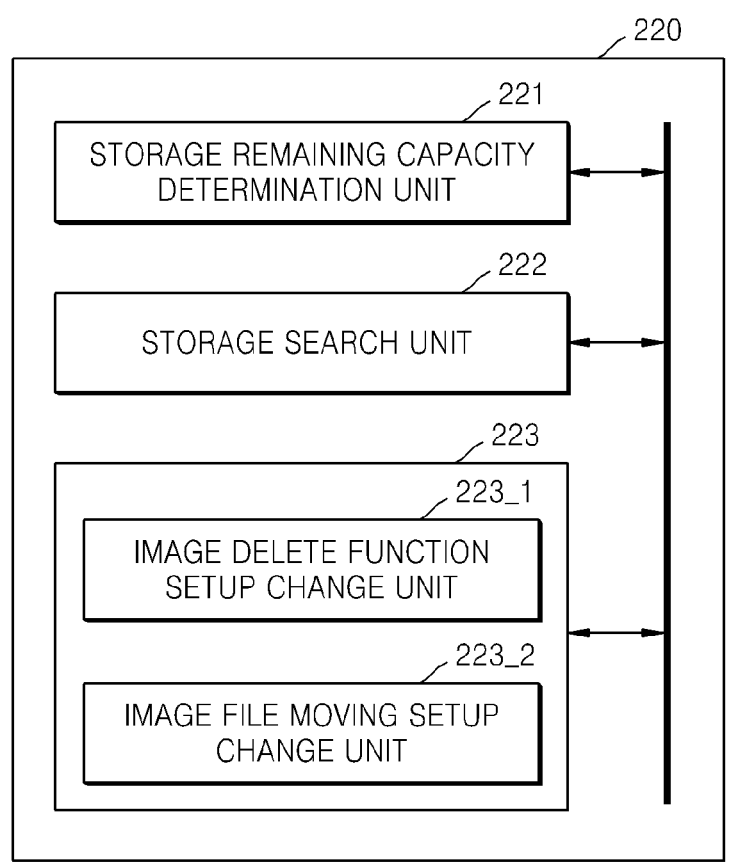

FIG. 5 is a block diagram of a control unit 220 of the digital photographing apparatus 10 illustrated in FIG. 2, according to another embodiment of the invention. The control unit 220 illustrated in FIG. 5 is different from the control unit 210 illustrated in FIG. 4 in a condition for changing an environment setup and the type of the environment setup to be changed. Thus, FIG. 5 will be described mainly with respect to the difference from FIG. 4.

Referring to FIGS. 2 and 5, the control unit 220 may include a storage remaining capacity determination unit 221, a storage search unit 222 and an environment setup change unit 223 including an image delete function setup change unit 223-1 and an image file moving setup change unit 223-2.

The storage remaining capacity determination unit 221 determines whether the storage 35 has a remaining capacity to store an image file.

The storage search unit 222 searches for an environment setup to be changed according to the determination result. If the storage 35 does not have a remaining capacity, an image delete function or an image file moving function may be activated.

The image delete function setup change unit 223-1 is a module for changing an environment setup according to the search result of the storage search unit 222. If the storage 35 does not have a remaining capacity, the image delete function setup change unit 223-1 may activate a recycle bin function for temporarily deleting image files. The recycle bin function is a function for storing an image file in a separate folder without permanently deleting the image file. Thus, even when an image file is deleted by mistake, the image file may be restored. By setting the recycle bin function as the image delete function, the storage 35 may temporarily have a remaining capacity. Also, in order to activate the recycle bin function, a pop-up window showing a message 'Do you want to execute a recycle bin function?' or an icon for executing the recycle bin function may be displayed on the display unit 15 such that a user may instantly execute the recycle bin function.

If the storage 35 does not have a remaining capacity, the image file moving setup change unit 223-2 may activate an image file moving function for moving image files to the external memory 37. For example, the image file moving setup change unit 223-2 may execute the image file moving function by checking whether the external memory 37 is mounted on the digital photographing apparatus 10 and whether the external memory 37 has a sufficient remaining capacity for storing image files to be moved, and displaying a pop-up window showing a message 'Do you want to start to move image files to external memory?' on the display unit 15 such that the user may instantly move the image files.

As such, if the storage 35 does not have a remaining capacity, the digital photographing apparatus 10 may automatically set an image delete function and an image file moving function at the same time and thus the remaining capacity may be controlled without deleting image files by mistake. Accordingly, a user may conveniently manage the capacity of the storage 35 without manually changing an environment setup.

Figure 6:
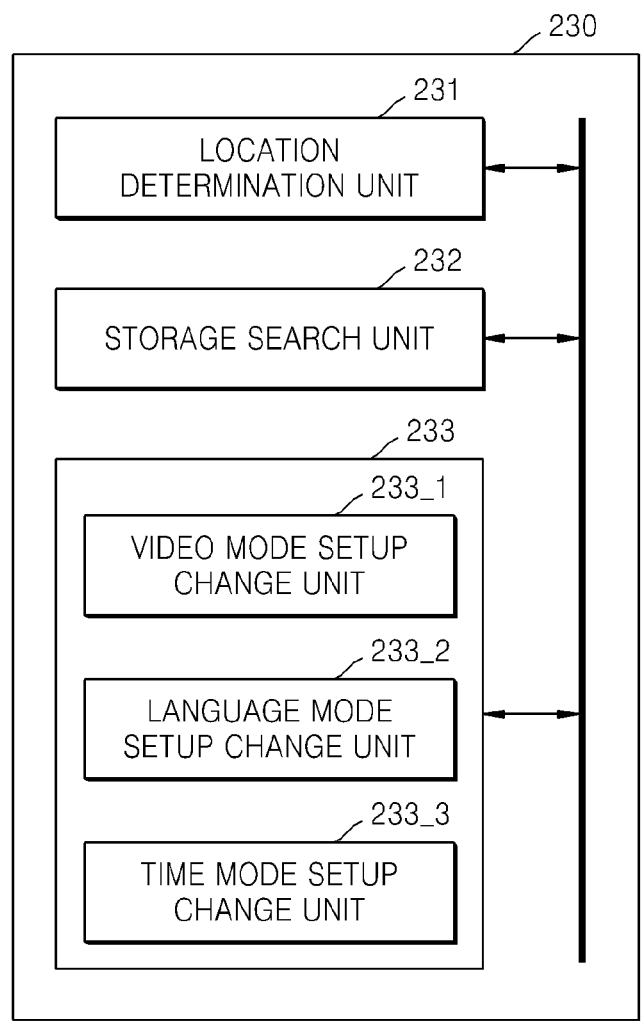

FIG. 6 is a block diagram of a control unit 230 of the digital photographing apparatus 10 illustrated in FIG. 2, according to another embodiment of the invention. The control unit 230 illustrated in FIG. 6 is different from the control units 210 and 220 illustrated in FIGS. 4 and 5 in a condition for changing an environment setup and the type of the environment setup to be changed. Thus, FIG. 6 will be described mainly with respect to the difference from FIGS. 4 and 5.

Referring to FIGS. 2 and 6, the control unit 230 may include a location determination unit 231, a storage search unit 232 and an environment setup change unit 233 including a video mode setup change unit 233-1, a language mode setup change unit 233-2 and a time mode setup change unit 233-3.

The location determination unit 231 determines a location of the digital photographing apparatus 10 by using its GPS information received by the GPS 29, i.e., time, latitude, longitude and altitude information. For example, the location determination unit 231 may three-dimensionally determine its time and current location (latitude, longitude and altitude) information by displaying the information on a digital map. However, a method of obtaining time and current location information by using GPS information is not limited thereto.

The storage search unit 232 searches the storage 35 for an environment setup corresponding to the time and location information.

If the location determined by the location determination unit 231 indicates Europe, since Europe uses a phase alternating line (PAL) method that is a color encoding method used in analog broadcasting systems, the video mode setup change unit 233-1 may change a video mode into a PAL mode. Also, if the location determined by the location determination unit 231 indicates Korea, Japan or North/Central America, the video mode setup change unit 233-1 changes the video mode into a national television system committee (NTSC) mode.

The language mode setup change unit 233-2 may change a language according to a country corresponding to the location determined by the location determination unit 231. For example, if the location determined by the location determination unit 231 indicates USA, the language mode setup change unit 233-2 may change a language mode into English. If the location determined by the location determination unit 231 indicates Japan, the language mode setup change unit 233-2 may change the language mode into Japanese.

The time mode setup change unit 233-3 changes a time mode into a date and time corresponding to the location determined by the location determination unit 231. Alternatively, the location determination unit 231 may obtain latitude and longitude information of the digital photographing apparatus 10 and time information may be obtained by communicating with a GPS satellite based on the latitude and longitude information.

Environment setup values to be changed when a location condition is satisfied are not limited to the video mode, the language mode and the time mode. A user may arbitrarily set conditions such that environment setups may be automatically changed when the conditions are satisfied. The user may arbitrarily input environment setups to be changed according to certain conditions. For example, if the location determined by the location determination unit 231 indicates France, the language mode may be changed into French and the time mode may be changed into one hour earlier than a local time of France in consideration of daylight saving time.

As such, the digital photographing apparatus 10 may be user-customized and environment setups may be automatically changed according to designated conditions.

Figure 7:
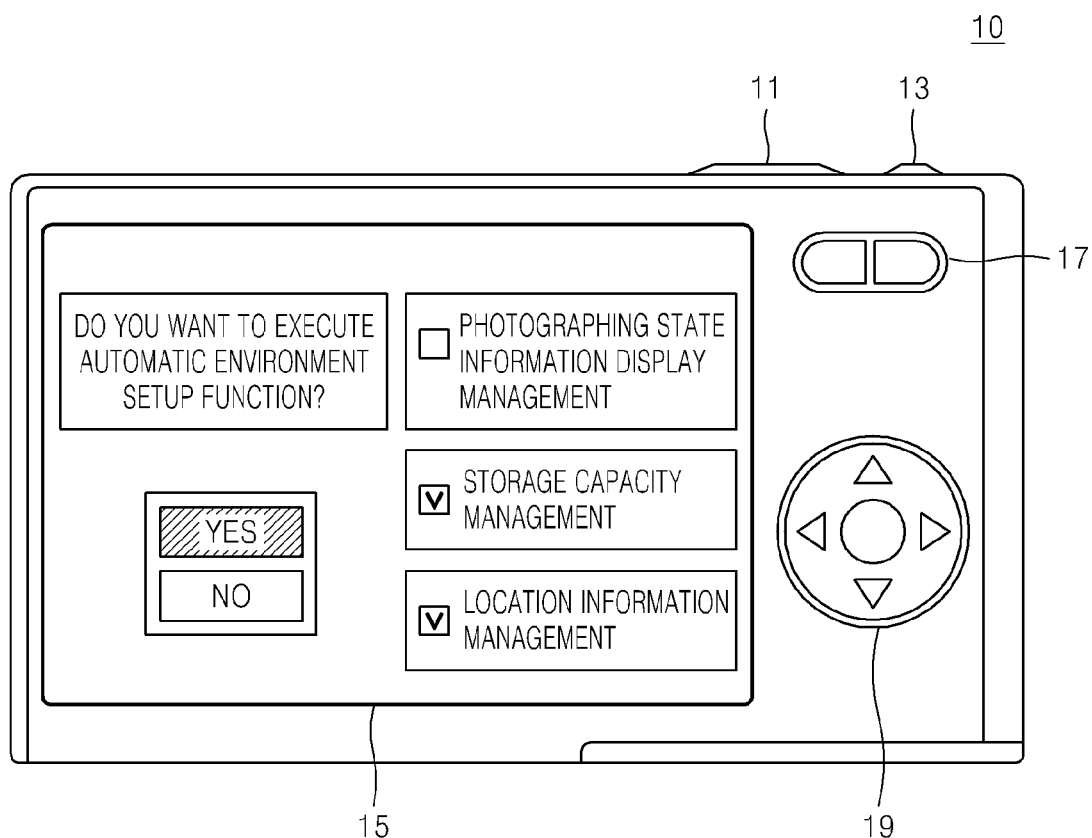
FIG. 7 is a rear view of the digital photographing apparatus illustrated in FIG. 1 when an automatic environment setup function is executed, according to an embodiment of the invention.

FIG. 7 is a rear view of the digital photographing apparatus 10 illustrated in FIG. 1 when an automatic environment setup function is executed, according to an embodiment of the invention.

Referring to FIG. 7, the automatic environment setup function may be activated or inactivated according to a user's selection. As illustrated in FIG. 7, the user selects whether to activate the automatic environment setup function by using the direction/menu selection button 19.

Various automatic environment setup functions exist as described above with reference to FIGS. 3 through 6, and the user may select one or more functions from among the automatic environment setup functions. For example, it is assumed that a photographing state information display management function is not used and that a storage capacity management function and a location information management function using a GPS are used. In this case, as illustrated in FIG. 7, functions desired by the user may be selected and executed. Although a condition for changing a function that is not selected is satisfied, an environment setup corresponding to the function is not automatically changed and an existing environment setup or a default value input when the digital photographing apparatus 10 is manufactured may be continuously maintained.

Figure 8:
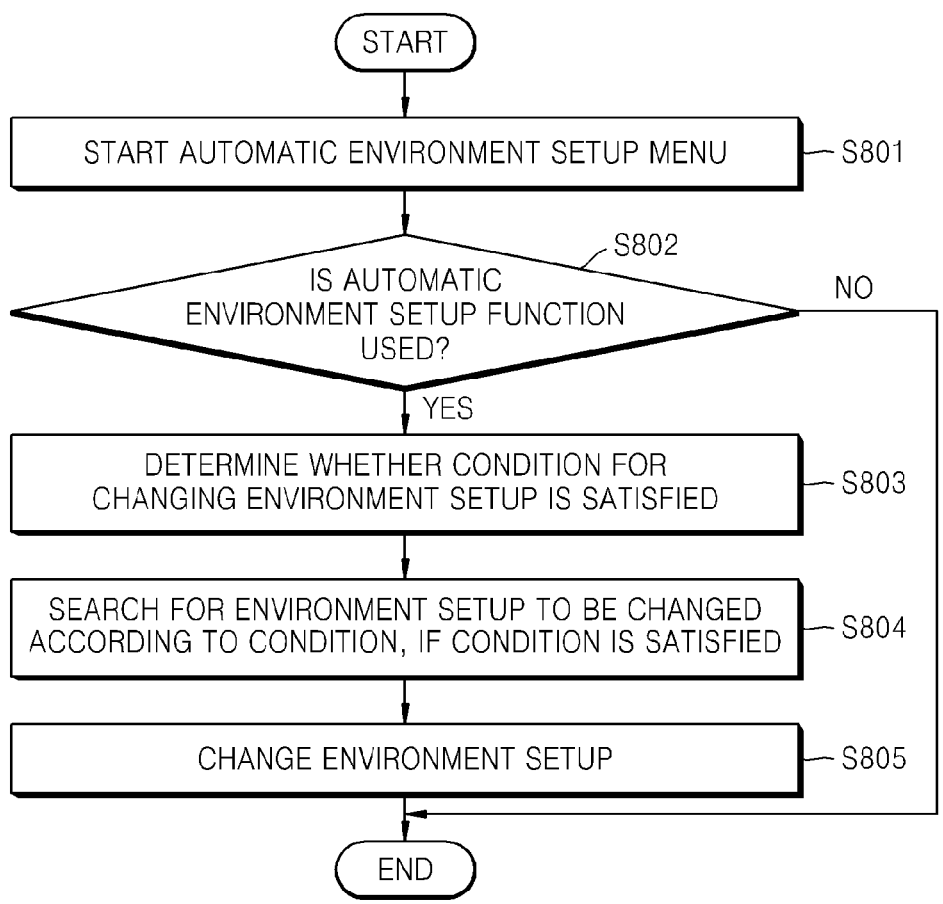
FIGS. 8 through 9 are flowcharts of a method of controlling the digital photographing apparatus illustrated in FIG. 2, according to embodiments of the invention.

FIG. 8 is a flowchart of a method of controlling the digital photographing apparatus 10 illustrated in FIG. 2, according to an embodiment of the invention.

Referring to FIGS. 2 and 8, as illustrated in FIG. 7, a user starts an automatic environment setup menu by using the manipulation unit 31 (operation S801) and selects whether to use an automatic environment setup function (operation S802).

If the user selects to use the automatic environment setup function, the control unit 200 of the digital photographing apparatus 10 determines whether a condition for changing an environment setup is satisfied (operation S803).

If a certain condition is satisfied, the storage 35 is searched for an environment setup to be changed according to the condition (operation S804) and the environment setup is accordingly and automatically changed (operation S805).

If the user selects not to use the automatic environment setup functions, the environment setup is not automatically changed and an existing environment setup is maintained until the user manually changes the environment setup.

Figure 9:
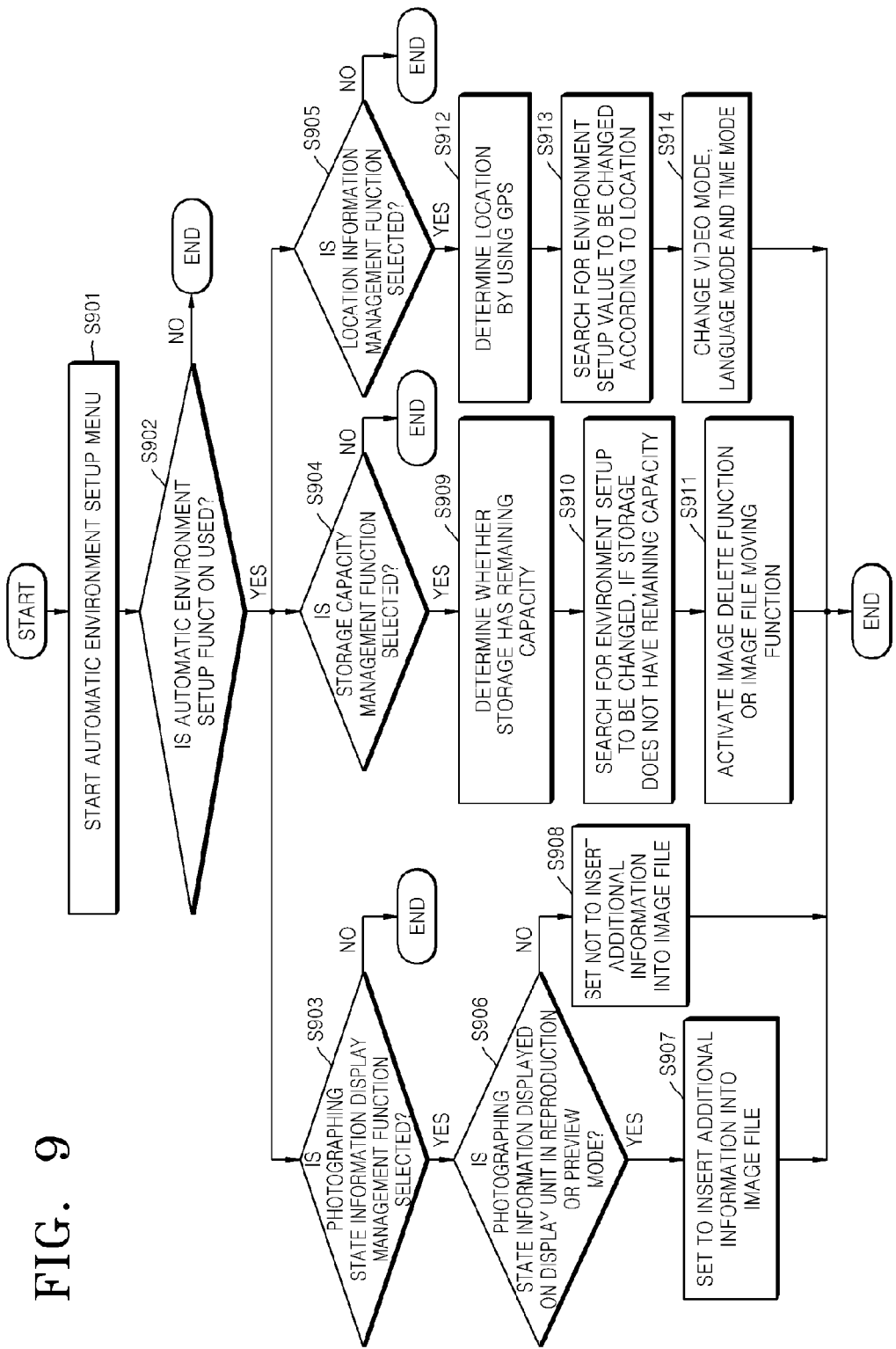

FIG. 9 is a flowchart of a method of controlling the digital photographing apparatus 10 illustrated in FIG. 2, according to another embodiment of the invention. The method of FIG. 9 is different from the method of FIG. 8 in that a condition and an environment setup to be changed according to the condition are specifically described. Thus, FIG. 9 will be described mainly with respect to the difference from FIG. 8.

Referring to FIGS. 2 and 9, an automatic environment setup menu is started (operation S901) and whether to use an automatic environment setup function is selected (operation S902). If it is selected to use an automatic environment setup function, various automatic environment setup functions are displayed on the display unit 15. For example, a photographing state information display management function (hereinafter referred to as a first function), a storage capacity management function (hereinafter referred to as a second function) and a location information management function (hereinafter referred to as a third function) are displayed and a user may select one or more desired functions (operations S903, S904 and S905).

If the first function is selected, the digital photographing apparatus 10 determines whether photographing state information is displayed on the display unit 15 by using, for example, icons in a reproduction mode or a preview mode (operation S906). That is, the digital photographing apparatus 10 determines whether the user displays the photographing state information such as flash on/off, shutter speed and an aperture value on the display unit 15 or not.

If the photographing state information is displayed, the user wants to display various types of information on an image and thus additional information such as a date, time and a memo is set to be inserted into an image file to be stored or output (operation S907).

If the photographing state information is not displayed, the user does not want to display various types of information on an image and thus the additional information is set not to be inserted into the image file to be stored or output such that a pure image is obtained (operation S908).

If the second function is selected, the digital photographing apparatus 10 determines whether the storage 35 has a remaining capacity (operation S909). Here, the storage 35 may be internal memory and may also be a secure digital (SD) card or a multimedia card (MMC) as a recording device for storing image files.

If the storage 35 does not have a remaining capacity, the digital photographing apparatus 10 searches for an environment setup value to be automatically changed (operation S910). For example, if the storage 35 does not have a remaining capacity, since a space for storing a newly generated image file does not exist, some of already-stored image files have to be temporarily deleted or to be moved to the external memory 37 so as to ensure a storage space.

An image delete function or an image file moving function may be activated as the environment setup value (operation S911). In more detail, the image delete function is used to activate a recycle bin function in order to temporarily delete image files and the image file moving function is used to move image files by recognizing the external memory 37 and checking the capacity of the external memory 37.

Although not shown in FIG. 9, if the storage 35 has a remaining capacity, a newly generated image file is stored in the storage 35.

If the third function is selected, the digital photographing apparatus 10 determines its location by using the GPS 29 (operation S912). The location may be determined in the form of latitude and longitude information or may be determined as country or city information by using the latitude and longitude information.

An environment setup value to be automatically changed when the location satisfies a certain condition is searched (operation S913).

A video mode, a language mode, a time mode and the like are automatically changed according to the location based on the search result (operation S914). For example, if the location is determined as Europe, the video mode may be automatically changed into a PAL mode. If the location is determined as USA, the language mode may be automatically changed into English and the time mode may be changed according to a local time of USA.

As such, when a user travels a different country, the GPS 29 of the digital photographing apparatus 10 determines a location and an environment setup may be automatically changed according to the location. Thus, the user does not need to manually change time, a video mode and the like.

Although the first through third functions are exemplarily described above, automatic environment setup functions are not limited thereto and environment setup values to be changed according to certain conditions may be designated by a user.

According to the invention, an environment setup of a digital photographing apparatus may be automatically changed according to a condition and thus a user may not experience inconvenience of manually changing the environment setup.

Also, an environment setup value to be changed according to the condition may be designated by the user and thus a user-customized digital photographing apparatus may be provided.

While the invention has been particularly shown and described with reference to exemplary embodiments thereof, it will be understood by one of ordinary skill in the art that various changes in form and details may be made therein without departing from the spirit and scope of the invention as defined by the following claims.

What is claimed is:

1. A method of controlling a digital photographing apparatus, the method comprising:
   receiving a selection signal of an automatic environment setup function of a plurality of automatic environment setup functions, wherein the automatic environment setup function comprises a command signal for indicating whether to insert additional information into an image file to be stored or output;
   determining whether photographing state information is displayed on a display unit in a reproduction mode or a preview mode;
   if the photographing state information is displayed, setting the command signal for indicating to insert the additional information; and
   if the photographing state information is not displayed, setting the command signal for indicating not to insert the additional information.

2. The method of claim 1, wherein the additional information is selected from the group consisting of a date, a time, and a memo.

3. The method of claim 1, wherein the command signal for indicating to insert the additional information comprises a value marked on a segment of a header of the image file.

4. The method of claim 1, wherein the photographing state information in a reproduction mode is selected from a group consisting of an icon representing a photographing date, an icon representing resolution, an icon representing flash on/off, an icon representing shutter speed, an icon representing an aperture value, an icon representing whether an audio memo exists, and an icon representing whether an image is protected.

5. The method of claim 1, wherein the photographing state information in a preview mode is selected from a group consisting of an icon representing a photographing mode such as an automatic, program or automatic speech recognition mode, an icon representing a scene mode, an icon representing an aperture value, an icon representing a shutter speed, an icon representing flash on/off, an icon representing an audio recording prohibition, an exposure correction mark, an icon representing a photometry, an icon representing an image quality, and an icon representing a resolution.

6. A digital photographing apparatus comprising:
   a condition determination unit configured to determine whether a condition for changing an environment setup of the digital photographing apparatus is satisfied,
   wherein the environment setup corresponds an automatic environment setup function selected by a selection signal from a plurality of automatic environment setup functions, and wherein the environment setup comprises a command signal configured to indicate whether to insert additional information into an image file to be stored or output;

a storage configured to store environment setups to be changed according to whether photographing state information is displayed on a display unit in a reproduction mode or a preview mode;

a storage search unit configured to search the storage for an environment setup to be changed according to whether the photographing state information is displayed on a display unit in a reproduction mode or a preview mode;

wherein the condition determination unit comprises a photographing state information display determination unit configured to determine whether the photographing state information is displayed on the display unit in the reproduction mode or the preview mode; and an environment setup change unit comprising an additional information insertion setup change unit configured to set a command signal for indicating to insert the additional information if the photographing state information is displayed, and configured to set a command signal for indicating not to insert the additional information if the photographing state information is not displayed.

7. The apparatus of claim 6, wherein the additional information is selected from the group consisting of a date, a time, and a memo.

8. The apparatus of claim 6, wherein the command signal for indicating to insert the additional information comprises a value marked on a segment of a header of the image file.

9. The apparatus of claim 6, wherein the photographing state information in a reproduction mode is selected from a group consisting of an icon representing a photographing date, an icon representing resolution, an icon representing flash on/off, an icon representing shutter speed, an icon representing an aperture value, an icon representing whether an audio memo exists, and an icon representing whether an image is protected.

10. The apparatus of claim 6, wherein the photographing state information in a preview mode is selected from a group consisting of an icon representing a photographing mode such as an automatic, program or automatic speech recognition mode, an icon representing a scene mode, an icon representing an aperture value, an icon representing a shutter speed, an icon representing flash on/off, an icon representing an audio recording prohibition, an exposure correction mark, an icon representing a photometry, an icon representing an image quality, and an icon representing a resolution.

* * * * *